(12) United States Patent
Mori et al.

(10) Patent No.: US 7,193,406 B2
(45) Date of Patent: Mar. 20, 2007

(54) DATA TRANSMITTING AND RECEIVING APPARATUS

(75) Inventors: Masayuki Mori, Kanagawa (JP); Keizo Ihara, Saitama (JP); Nobukazu Sasaki, Yamanashi (JP); Teruyoshi Kobayashi, Tokyo (JP)

(73) Assignee: TEAC Corporation, Musashino (JP)

( * ) Notice: Subject to any disclaimer, the term of this patent is extended or adjusted under 35 U.S.C. 154(b) by 0 days.

(21) Appl. No.: 11/284,432

(22) Filed: Nov. 21, 2005

(65) Prior Publication Data

US 2006/0158175 A1    Jul. 20, 2006

(30) Foreign Application Priority Data

Nov. 26, 2004    (JP)    ............................. 2004-343105

(51) Int. Cl.
*G11C 7/00*    (2006.01)
*G11C 7/02*    (2006.01)

(52) U.S. Cl. ................. 324/76.61; 340/538.15

(58) Field of Classification Search ............. 324/76.61; 340/538.15, 3.41, 511; 370/490
See application file for complete search history.

(56) References Cited

U.S. PATENT DOCUMENTS

| | | | | |
|---|---|---|---|---|
| 5,463,340 A | * | 10/1995 | Takabatake et al. | ........ 327/211 |
| 5,666,302 A | * | 9/1997 | Tanaka et al. | ............... 708/819 |
| 5,859,584 A | * | 1/1999 | Counsell et al. | ............ 340/538 |
| 6,178,080 B1 | * | 1/2001 | Wilken et al. | .............. 361/119 |
| 6,252,503 B1 | * | 6/2001 | Berger et al. | ................ 340/514 |
| 2005/0280408 A1 | * | 12/2005 | Wobschall | .................. 324/115 |

* cited by examiner

*Primary Examiner*—Anjan Deb
(74) *Attorney, Agent, or Firm*—Christensen O'Connor Johnson Kindness PLLC

(57) ABSTRACT

In a TEDS system, a data transmitting and receiving apparatus is provided and a signal transmitted from a TEDS memory to an apparatus side is logically inverted without using a transformer, and further a sneak signal is prevented.

Inverters 28, 30 and zener diodes 32, 34 connected in parallel between the TEDS memory and a data driver of the apparatus are provided. Data transmitted from the TEDS memory to an apparatus 18 side is logically inverted by the inverter 28, and the logical voltage attenuates by a predetermined amount at the zener diode 32 to be supplied to the data driver. Since a sneak signal 100 whose logical voltage attenuates by a predetermined amount again by the zener diode 34 is supplied to the inverter 30, the transmission of a logic value is prevented by setting the threshold of the inverter 30 appropriately.

8 Claims, 6 Drawing Sheets

FIG. 8
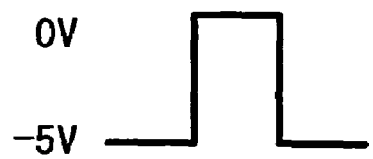
| B | A | ON |
|---|---|---|
| L | L | X0, Y0 |
| L | H | X1, Y0 |
| H | L | X0, Y1 |
| H | H | X1, Y1 |
FIG. 9A
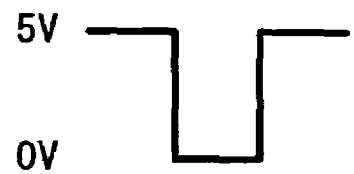
FIG. 9B
FIG. 9C
1.4V
FIG. 9D
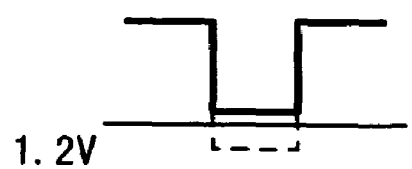
1.2V

DATA TRANSMITTING AND RECEIVING APPARATUS

CROSS REFERENCES TO RELATED APPLICATIONS

The present invention contains subject matter related to Japanese Patent Application JP 2004-343105 filed in the Japanese Patent Office on Nov. 26, 2004, the entire contents of which being incorporated herein by reference.

BACKGROUND OF THE INVENTION

1. Field of the Invention

The present invention relates to a data transmitting and receiving apparatus, particularly to an apparatus that transmits data to and receives data from a memory included in a sensor, which stores calibration data and the like.

2. Description of the Related Art

In related art, what is called a TEDS (Transducer Electronic Data Sheet) has been proposed in which a memory is included in a sensor and data on a manufacturer, kind, type, serial number, calibration value, calibration date and time, and the like of the sensor are stored in the memory to be read and written in accordance with the necessity, and TEDS is standardized as IEEE1451.4. TEDS has a simplified configuration in which a single signal line is shared by a signal line from the sensor and a data line that performs read/write of data on the memory. Since a signal detected by the sensor is typically output from the sensor as a voltage signal having a positive value, a binary signal having a negative value is used as digital data output from the memory in order to prevent a collision with the above signal. The sensor signal may be driven by +5V and the digital data of the memory may be driven by -5V. Hereinafter, a system including a sensor provided with a memory and a data transmitting and receiving apparatus to which a signal detected by the sensor and data from the memory are input and which supplies various kinds of commands or the data to be write-in to the memory, is called a TEDS system in this description.

FIG. 1 is a block diagram showing a configuration of the TEDS system. A sensor 10 and a data transmitting and receiving apparatus 18 are connected by a single signal line 1. An amplifier 12, a sensor element 14 and a TEDS memory 16 are provided in the sensor 10. The amplifier 12 and the sensor element 14 are connected in series to the signal line 1 through a diode and are further connected to a GND terminal on the apparatus 18 side. Further, a negative side terminal of the TEDS memory 16 is connected to the signal line 1 through the diode, and a positive side terminal of the TEDS memory 16 is connected to a GND terminal on the apparatus 18 side. A switch 20 that switches between an analogue terminal (ANALOG) and digital terminal (DIGITAL), a constant electric-current source 22 connected to a positive power supply and a negative power supply 24, are provided in the data transmitting and receiving apparatus 18. The switch 20 is switched to the analogue terminal side when the sensor element 14 is driven, and the switch 20 is switched to the digital terminal side when the TEDS memory 16 is driven.

FIG. 2 shows a configuration in the case where the switch 20 is switched to the analogue terminal side. Since the sensor 10 is connected to the constant electric-current power source 22 of a positive voltage (+5V for example) in the apparatus 18, the sensor element 14 is driven by a constant electric-current through the diode on the upper side in the figure. The sensor element 14 is, for example, a three-axis acceleration sensor element of a piezoresistance type, and an analogue sensor output (voltage signal) corresponding to the acceleration is output from an analogue signal output terminal on the apparatus 18 side. After being converted into a digital signal in an A/D converter, the analogue sensor output is stored in the memory of the apparatus 18, for example. The apparatus 18 functions as a data recorder for the sensor 10.

FIG. 3 shows a configuration in the case where the switch 20 is switched to the digital terminal side. Since the sensor 10 is connected to the power source 24 of a negative voltage (-5V for example) in the apparatus 18, logic power is supplied to the TEDS memory 16 through the diode on the lower side in the figure and the transmitting and receiving of data is executed between the TEDS memory 16 and a digital data I/O in the apparatus 18. Specifically, a data driver of the apparatus 18, which has input and output terminals, is connected to the digital data I/O and when a calibration value and the like of the sensor which are stored in the TEDS memory 16 are read out, a read command is transmitted from the data driver and digital data transmitted from the TEDS memory 16 is received by the data driver in accordance with the read command. Further, when data is newly written into the TEDS memory 16 (or the data is renewed), write data is supplied from the data driver to the TEDS memory 16 following a write command. However, because the TEDS memory 16 is based on the negative voltage (-5V) and typically the data driver is driven by the positive voltage, the transmission and reception of data with respect to the TEDS memory 16 becomes a inverted logic and a logic inversion circuit is needed for transmitting and receiving the data between the data driver and the TEDS memory 16.

FIG. 4 shows an example of the logic inversion circuit provided in the apparatus 18, in which a transformer 26 is used as an inversion element, for example. Data transmitted from the TEDS memory 16 to the apparatus 18 (an input signal when seen from the apparatus 18) is a rectangular pulse signal that has the reference -5V with 0V as the peak value. The data values "0" and "1" are expressed with a pulse width, respectively and the data value "1" is expressed with a short pulse width and the data value "0" is expressed with a long pulse width. One terminal on the output side of the transformer 26 is connected to the GND and the inverted signal is obtained from the other terminal. The output signal is the rectangular pulse signal that has the reference 0V with 5V as the peak value.

An inversion circuit using a transformer is disclosed in the following Patent document 1.

Patent document 1: PCT Publication No. WO 02/052861 A2.

SUMMARY OF THE INVENTION

In order to logically invert the signal, a transformer is typically used in many cases as described above, however, signal attenuation and impedance matching have to be considered when the transformer is connected, and further there is a disadvantage regarding the size thereof. Therefore, it is desirable that other elements than the transformer is used to obtain logical inversion. On the other hand, because in the TEDS system the signal detected by the sensor and the digital signal of the TEDS memory 16 are transmitted and received by sharing the single signal line as described above, it is required to permit the transmission of the command and write data transmitted from the apparatus 18 side to the TEDS memory 16; to permit the transmission of the read data transmitted from the TEDS memory 16 to the apparatus 18; and to prevent what is called a sneak in which the signal that should be transmitted from TEDS memory 16 to the apparatus 18 sneaks into the transmission path when transmitting data from the apparatus 18 side to the TEDS memory 16 and exerts an influence.

The present invention provides an apparatus in which the logic inversion is obtained in the TEDS system without using a transformer and the sneak signal can be prevented efficiently.

A data transmitting and receiving apparatus according to an embodiment of the present invention is in a sensor system which has a sensor unit that includes a sensor element and memory storing the data regarding the sensor element and the data transmitting and receiving apparatus to which a detected signal from the sensor element is input and which transmits data to and receives data from the memory; and in which the input of the detected signal and the data transmission and reception is performed by sharing a single signal line, and the data transmitting and receiving apparatus includes: a first logic inversion element and a second logic inversion element connected in parallel in the direction opposite to each other and connected in series to the single signal line, and a level limiter connected in series at least to either the signal output side of the first logic inversion element or the signal input side of the second logic inversion element.

Further, a data transmitting and receiving apparatus according to an embodiment of the present invention is in a sensor system which has a sensor unit that includes a sensor element and a memory storing the data regarding the sensor element; and the data transmitting and receiving apparatus to which a detected signal from the sensor element is input and which transmits data to and receives data from the memory; and in which the input of the detected signal and the data transmission and reception is performed by sharing a single signal line, and the data transmitting and receiving apparatus includes: a first comparator which is connected to the single signal line and which compares a signal from the memory with a predetermined first threshold; a first inversion circuit which is connected to the first comparator and which logically inverts a signal from the memory in accordance with a comparison result; a diode connected to the first inversion circuit; a data driver connected to the diode; a second comparator branching and connected between the diode and the data driver and which compares a signal from the data driver and a sneak signal from the diode with a predetermined second threshold; a threshold generation circuit which supplies the second threshold to the second comparator; and a second inversion circuit which is connected to the second comparator and which logically inverts a signal from the data driver in accordance with a comparison result to be output to the single signal line and blocks the transmission of the sneak signal.

According to embodiments of the present invention, logic inversion can be made and logical transmission by a sneak signal can be prevented by using the combination of a logic inversion element and a level limiter such as a diode. In the case where data is transmitted from the memory of the sensor unit to the apparatus side, logic inversion is performed in the logic inversion element and further the logical voltage level attenuates in the level limiter such as a diode to be transmitted. The signal logically inverted is received on the apparatus side and a sneak signal again passes through the logic inversion element, however, because the logical voltage level has attenuated with the level limiter such as a diode, transmission of the logic can be prevented by a magnitude relation to the threshold of the logic inversion element. In other words, because the logical voltage level has attenuated with the level limiter, the logic inversion level does not reach the threshold even if the sneak signal is input to the logic inversion element, and therefore the logic is not transmitted.

According to the present invention, a data transmitting and receiving apparatus that includes a logic inversion circuit which is small-sized and which prevents a sneak signal can be obtained, and therefore a small and stable TEDS system can be obtained.

BRIEF DESCRIPTION OF THE DRAWINGS

These and other objects and features of the present invention will become clear from the following description of the preferred embodiments given with reference to the accompanying drawings, in which

FIG. 8 is a truth table of an IC in FIG. 7;

FIGS. 9A to 9D are an explanatory diagrams showing each signal waveform at respective portions in FIG. 7.

DESCRIPTION OF THE PREFERRED EMBODIMENTS

Hereinafter, embodiments of the present invention are explained with reference to the drawings.

Figure 1:
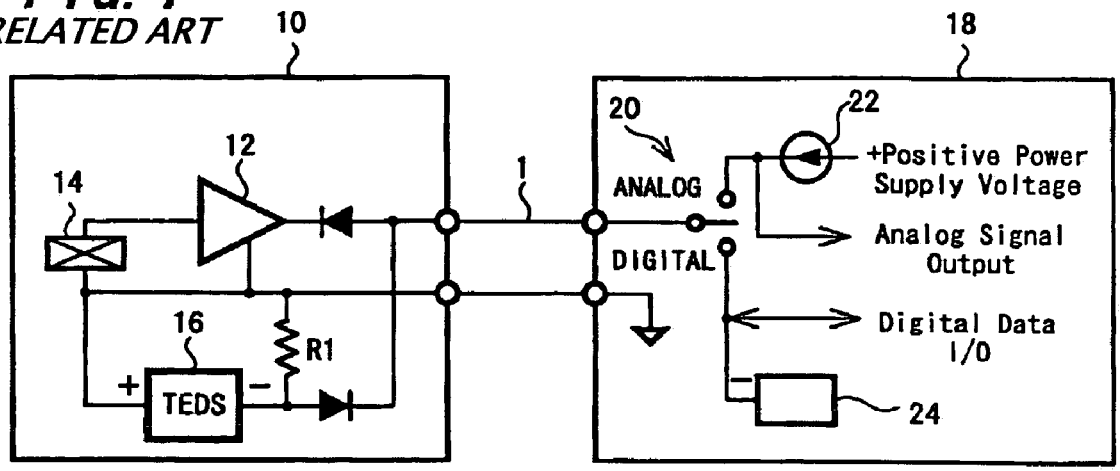
FIG. 1 is a diagram showing a configuration of a TEDS system.
Figure 2:
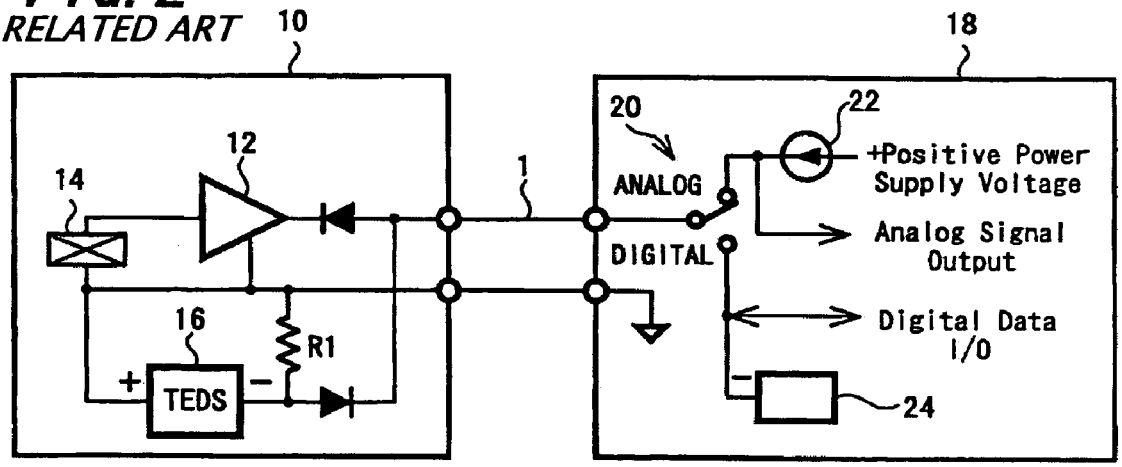
FIG. 2 is a diagram showing a configuration of the TEDS system in the case where a sensor output is input.
Figure 3:
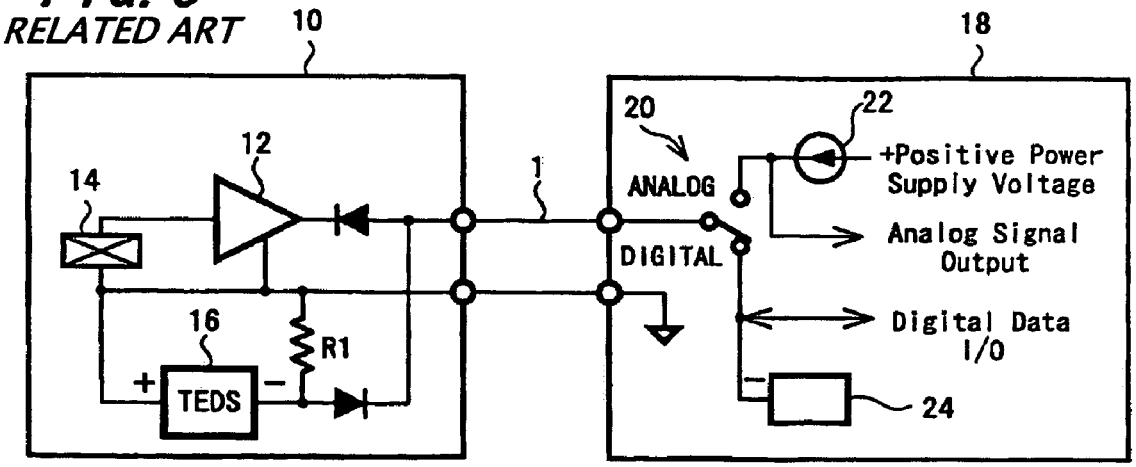
FIG. 3 is a diagram showing a configuration of the TEDS system in the case where data in the TEDS memory is read out.
Figure 4:
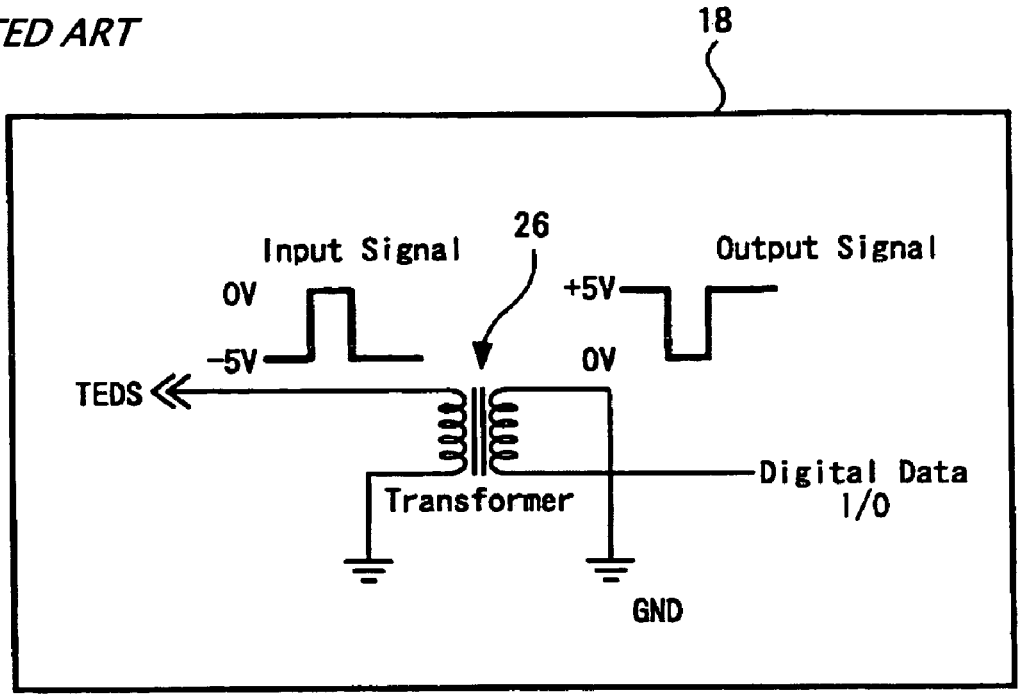
FIG. 4 is a diagram showing a structure of a logic inversion circuit using a transformer.
Figure 5:
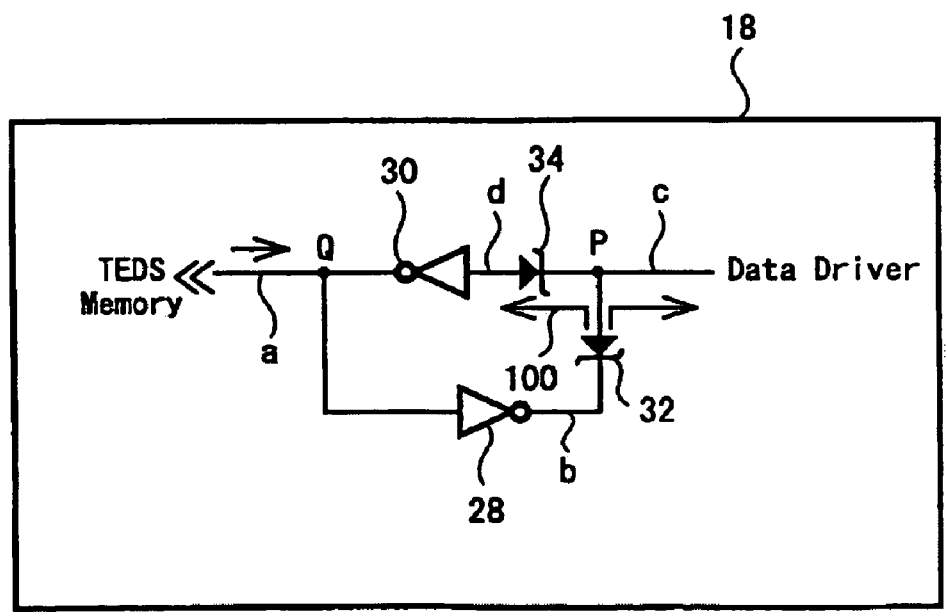
FIG. 5 is a diagram showing a basic configuration according to an embodiment of the present invention.

FIG. 5 shows a basic structure of a logic inversion circuit provided in a digital data I/O in a data transmitting and receiving apparatus 18 of this embodiment. Two inverters 28, 30 are connected in parallel in the direction opposite to each other between the TEDS memory 16 and the data driver of the apparatus 18. The inverter 28 on the lower side functions as a logic inversion element for the data transmitted from the TEDS memory 16 to the apparatus 18, and the inverter 30 on the upper side functions as a logic inversion element for the data transmitted from the apparatus 18 (data driver) to the TEDS memory 16. Further, a zener diode 32 is connected to the output side of the inverter 28, and a zener diode 34 is connected to the input side of the inverter 30. A connection branch point P exists between the zener diode 34 and data driver, and the zener diode 32 is connected to the connection branch point P. Furthermore, a connection branch point Q exists between the TEDS memory 16 and the inverter 30, and the inverter 28 is connected to the connection branch point Q.

In the case where digital data is transmitted from the TEDS memory 16 to the apparatus 18, the digital data (rectangular wave voltage signal driven with a negative voltage) from the TEDS memory 16 is logically inverted by the inverter 28 and the logical voltage (peak value voltage) attenuates by a predetermined amount of voltage at the zener diode 32 and is supplied to the data driver. At this time, although the signal passed through the zener diode 32 is not only transmitted to the data driver but also sneaks into the TEDS memory 16 side at the connection branch point P (shown as a signal 100 in FIG. 5), the sneaked signal whose logical voltage again attenuates by a predetermined amount of voltage by the zener diode 34 is supplied to the inverter 30. Therefore, by setting the threshold (inversion threshold) of the inverter 30 to a suitable value, that is, by setting the threshold to be larger than the logical voltage level (peak value voltage), transmission of the sneak signal having a logical voltage attenuated by two times the predetermined voltage can always be blocked.

In the case where data is transmitted from the data driver of the apparatus 18 to the TEDS memory 16, because the transmission data passes through only the zener diode 34 and is supplied to the inverter 30, the inverter 30 can logically inverts the signal to be output to the TEDS memory 16, unlike a sneak signal. A magnitude relation among the threshold, logical voltage level and predetermined voltage (drop voltage) in the zener diodes 32, 34 is [original logical voltage level−predetermined voltage]>threshold>[original logical voltage level−2×predetermined voltage].

Figure 6A:
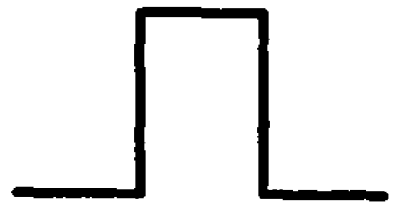
FIGS. 6A to 6D are explanatory diagrams showing each signal waveform at respective portions in FIG. 5.
Figure 6B:
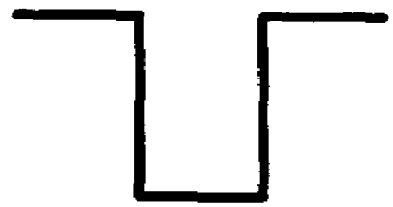
Figure 6C:
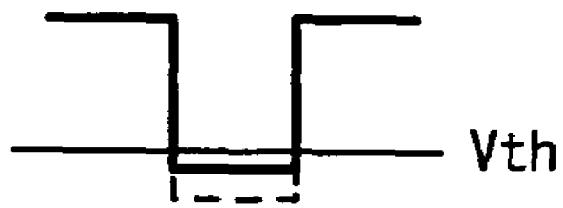
Figure 6D:
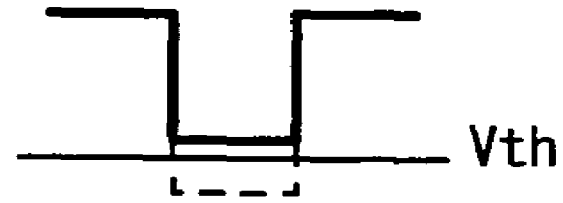

FIGS. 6A to 6D show signal a waveform at each of portions a to d in FIG. 5. FIG. 6A shows a signal waveform of the portion a, which is of a signal transmitted from the TEDS memory 16. The signal is supplied to the inverter 28 and is inverted by the inverter 28. FIG. 6B shows a signal waveform of the portion b, which is an output signal waveform of the inverter 28. The signal logically inverted is supplied to the zener diode 32, and the logical voltage attenuates by a predetermined voltage and is supplied to the data driver. FIG. 6C shows a signal waveform of the portion c. A broken line in the figure shows a logical voltage before the input to the zener diode 32. Vth is a threshold in the inverter 30. The logical voltage still exceeds the threshold Vth. On the other hand, FIG. 6D shows a signal waveform of the portion d, which is a sneak signal that has passed through the zener diode 34. Regarding the sneak signal 100, because the logical voltage thereof further attenuates by a predetermined voltage at the zener diode 34, the logical voltage becomes smaller than the threshold Vth and the logic value is not transmitted with the inversion at the inverter 30. Therefore, the sneak signal 100 can be prevented from being supplied to the TEDS memory 16 or again to the inverter 28.

Note that, although two zener diodes 32, 34 are used in FIG. 5, a configuration without the zener diode 34 can also be employed in which the threshold Vth is suitably set in the inverter 30 and only the zener diode 32 is connected. Further, regarding the zener diodes 32, 34, any element can be used as long as the element has a function of attenuating the logical voltage level of an input signal (such as a level limiter that limits a peak value level).

When data stored in the TEDS memory 16 is read out, a read command is supplied from the data driver to the TEDS memory 16. The command signal is logically inverted through the zener diode 34 and inverter 30 and is supplied to the TEDS memory 16 and, although part of the signal sneaks through the inverter 28 and the zener diode 32 at the connection branch point Q, this sneak signal virtually does not cause a problem, because the signal passes through two inverters 30, 28 and has the same polarity as the original signal. The same thing can be said regarding write data when data is written into the TEDS memory 16.

Figure 7:
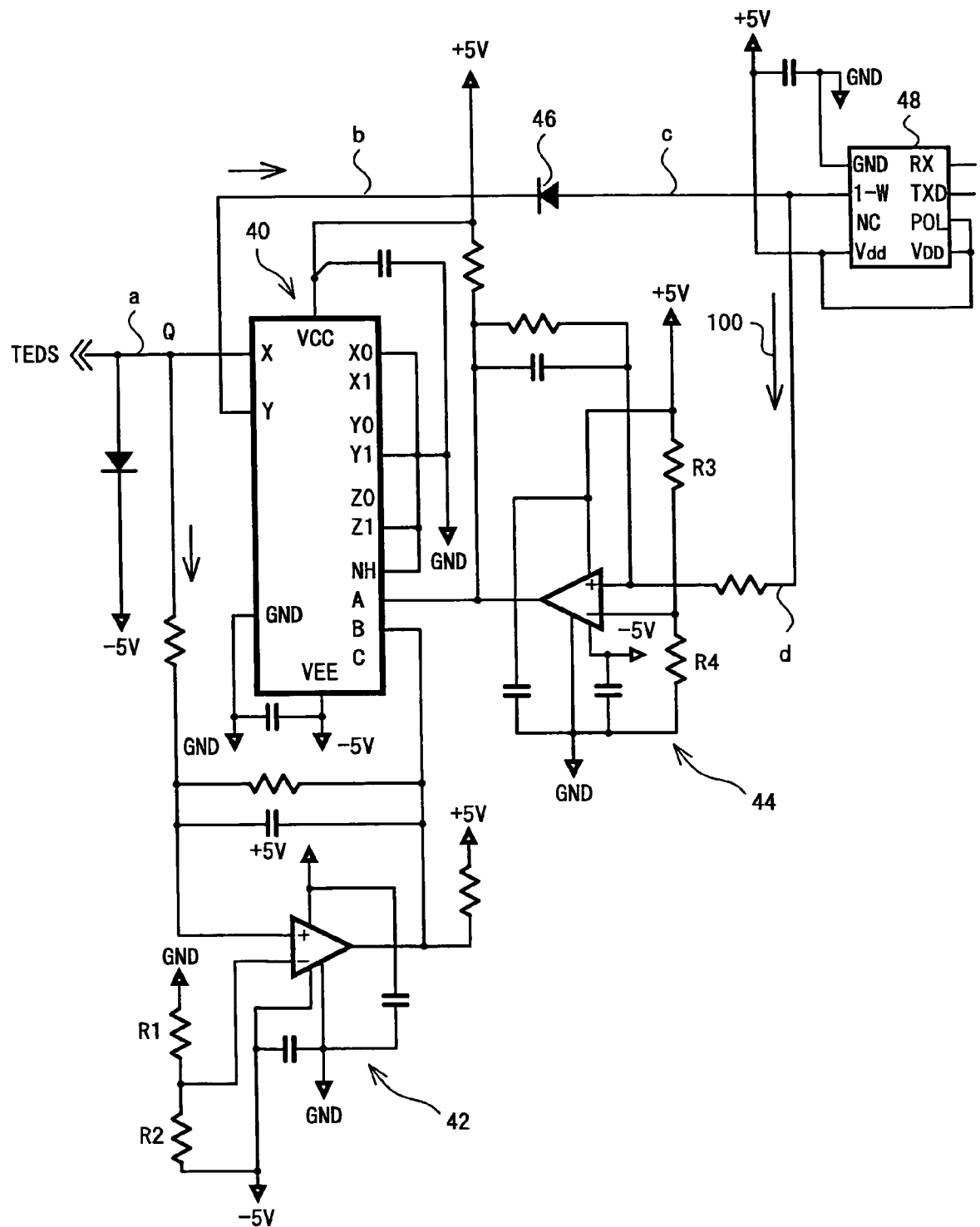
FIG. 7 is a circuit structure diagram according to an embodiment of the present invention.

FIG. 7 shows a circuit diagram of the logic inversion circuit of this embodiment in detail, in which one diode 46 is used instead of the zener diodes 32, 34 in FIG. 5. An IC 40 and a comparator 42 function as the inverter 28, and the IC 40 and a comparator 44 function as the inverter 30.

A negative side terminal of the TEDS memory 16 in the sensor 10 is connected to the power source of −5V through the diode and is further connected to the non-inversion input terminal (+) of the comparator 42 through the connection branch point Q. Furthermore, the terminal is connected to a terminal X of the IC 40. A dividing voltage defined by two resistances R1 and R2 is supplied to a inversion input terminal (−) of the comparator 42 as the threshold. The comparator 42 compares the signal from the TEDS memory 16 with the threshold and supplies the result of the comparison to a terminal B of the IC 40. That is, an H (High) is output if the signal level is equal to or larger than the threshold, and an L (Low) is output if the signal level is smaller than the threshold. An output terminal of the comparator 42 is connected to the terminal B of the IC 40. One end of the series resistances R1, R2 is connected to the GND, and the other end is connected to the power source of −5V. The resistance values of the resistances R1 and R2 are adjusted, and the inversion threshold is set to approximately −3.5V. Hereupon, the inversion threshold is a level with which the output of the comparator 42 is changed from L to H, and correspondingly to the event that the output of the comparator 42 is changed from L to H, an input signal is logically inverted at the IC 40, as described later on.

The IC 40 is a CMOS digital IC used for the logic inversion and has X0, X1, Y0, Y1, Z0 and Z1 as the input terminals, X, Y as the output terminals and A, B and C as the control terminals, respectively. FIG. 8 shows the truth table of the IC 40. The X0 and the Y0 become ON if the terminal A and terminal B of the IC are L (low), and the input signal to the terminal X0 is output from the terminal X and the input signal to the terminal Y0 is output from the terminal Y. The terminal X0, terminal Y1 and terminal Z1 are all connected to the GND, and if the terminal B is L, 0V is output from the terminal X and 5V (equal to the power supply voltage Vcc) is output from the terminal Y. Further, if the terminal B is H, the X0 and Y1 are ON and 0V is output from the terminal X and terminal Y, respectively. Since the comparator 42 compares the input signal from the TEDS memory 16 with the threshold and outputs L if the input signal is smaller than the threshold, and outputs H if the input signal is larger than the threshold, to be supplied to the terminal B of the IC 40, the terminal B becomes L to be converted into 5V and is output when the input signal level is −5V and the terminal B becomes H to be converted into 0V and is output when the input signal level is 0V. In this way, the rectangle wave signal of reference −5V with 0V as a peak value is logically inverted to the signal of reference 5V with 0V as a peak value to be output from the terminal Y.

The terminal Y of the IC 40 is connected to a one-line data driver IC 48 through a diode 46. Further, a connection branch point P is provided between the diode 46 and the IC 48, and the terminal Y is also connected to the non-inversion input terminal of the comparator 44 at this branch point. Regarding the signal logically inverted at the IC 40 and output from the terminal Y, the logical voltage thereof attenuates by a predetermined voltage (1.4V, for example) in the diode 46 and the signal is supplied to the IC 48. The IC 48 reads out the data of the TEDS memory 16 by receiving this signal. Here, the attenuation of the predetermined voltage caused by the diode is set to the extent with which no influence is imposed for the IC 48 to judge the logic value. On the other hand, because there is the connection branch point P, the signal transmitted from the TEDS memory 16 and logically inverted by the IC 40 is also supplied to the comparator 44 as the sneak signal 100.

The IC 48 is an IC that transmits and receives data by one line, and has each terminal of a GND, 1-*w*, NC, Vdd, RX, TXD, POL and Vpp. The terminal 1-*w* is an input-output terminal, the terminal NC is an non-connection terminal, the terminal Vdd is a power supply terminal supplying −4.5V to 5.5V, the terminal Vpp is a voltage terminal for the EPROM program, the terminal RX is a serial data transmitting terminal, the terminal TXD is a serial data receiving terminal, and the terminal POL is a polarity selection terminal for the RX and TXD. In this embodiment, the power supply of 5V is connected to the Vdd, and the IC 48 is driven with 5V. Data from the TEDS memory 16 received at the terminal 1-*w* is output from the terminal RX to the outside, for example, to a data recorder. Further, command data and write data from the outside are input to the terminal TXD and are transmitted from the terminal 1-*w* to the TEDS memory 16. The signal transmitted from the terminal 1-*w* is input to the non-inversion input terminal of the comparator 44 through the connection branch point P. On the other hand, the dividing voltage defined by the resistances R3, R4 is supplied to the inversion input terminal of the comparator 44 as the threshold. One end of the series resistances R3, R4 is connected to the power supply of 5V, and the other end is connected to the GND. The resistance value of the resistances R3 and R4 is adjusted to set the threshold to approximately 1.2V, for example. The output terminal of the comparator 44 is connected to the terminal A of the IC 40. If the signal level is equal to or larger than the threshold, H is supplied to the terminal A and if the signal level is smaller than the threshold, L is supplied to the terminal A. As shown in the truth table in FIG. 8, the terminal X1 becomes ON when the terminal A is H, and −5V is output from the terminal X, and the terminal X0 becomes ON when the terminal A is L, and 0V is output from the terminal X. Therefore, if the signal of reference 5V with 0V as the peak value is input to the comparator 44, the signal of 5V exceeds the threshold and the terminal A becomes H, and then −5V is output from the terminal X; and the signal becomes smaller than threshold when it is 0V, and the terminal A becomes L, and then 0V is output from the terminal X. Since the terminal X is connected to the TEDS memory 16, the signal from the terminal 1-*w* is logically inverted and is supplied to the TEDS memory 16.

On the other hand, regarding the above-described sneak signal 100, since the logical voltage thereof (peak value voltage) attenuates at the diode 46 from 0V to the predetermined voltage, specifically, attenuates by approximately 1.4V and the difference between the reference voltage and the peak value voltage becomes 3.6V, the result compared with the threshold always becomes signal level>threshold, if it is input to the comparator 44, consequently, the terminal A always becomes H, and only −5V is output from the terminal X. Therefore, the logic value of the sneak signal 100 is not transmitted to the TEDS memory 16 or the comparator 42.

FIGS. 9A to 9D show each signal wave form of portions a through d in the circuit of FIG. 7. FIG. 9A shows the signal wave form of the portion a in FIG. 7, which is a rectangle waveform of reference −5V with 0V as a peak value output from the TEDS memory 16. FIG. 9B shows the signal wave form of the portion b, which is an output waveform from the terminal Y of the IC 40 and which is a rectangle waveform of reference 5V with 0V as a peak value and is the waveform in which the signal waveform of FIG. 9A is logically inverted and is further shifted by 5V. It is shifted by 5V because the IC 48 in the apparatus 18 operates by Vdd=5V. FIG. 9C shows the signal wave form of the portion c, and it is the signal waveform after having passed through the diode 46. The logical voltage attenuates by 1.4V, and the difference between the reference voltage and the peak value voltage is reduced to 3.6V. This signal is input to the terminal 1-*w* of the IC 48 and is further input to the comparator 44 as the sneak signal 100. FIG. 9D shows the relation between the waveform of the sneak signal 100 and the threshold Vth of the comparator 44. Since the threshold Vth is equal to 1.2V and the peak value does not exceed this threshold, the output of the comparator 44, namely, the terminal A is always H and is not logically inverted and therefore the sneak signal 100 is not transmitted.

Figure 10:
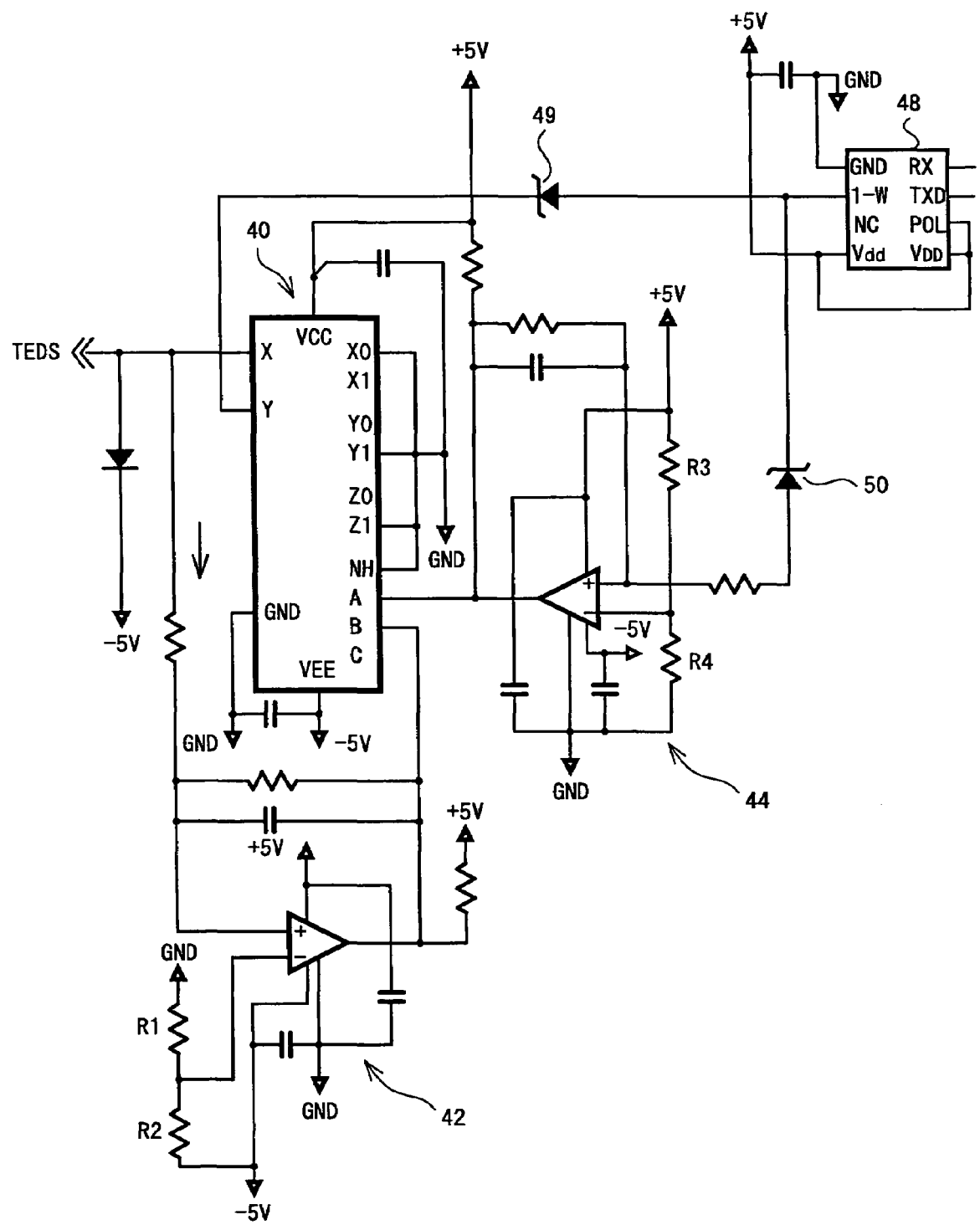
FIG. 10 is a circuit structure diagram according to another embodiment of the present invention.

Thus, in the logic inversion circuit of FIG. 7, the bidirectional logic inversion can be obtained with the single signal line and further the influence of the sneak signal can be prevented. In the circuit of FIG. 7, because the logical transmission of the sneak signal 100 is prevented by making the logical voltage thereof smaller than the threshold of the comparator 44 by using the voltage attenuation at the diode 46, it is necessary to set the threshold of the comparator 44 with comparatively high accuracy, and which is obtained by resistance dividing voltage of the series resistances R3, R4 in this embodiment. As shown in FIG. 5, it is suitable to use the zener diode as the diode 46, and further a plurality of the diodes 46 may be connected in series. Similarly to FIG. 5, of course another diode may be provided on the input side of the comparator 44. FIG. 10 shows a structure of the logic inversion circuit in this case. A zener diode 49 is provided instead of the diode 46, and a zener diode 50 is provided with the non-inversion input terminal of the comparator 44. The zener diode 49 corresponds to the zener diode 32 in FIG. 5 and the zener diode 50 corresponds to the zener diode 34 in FIG. 5.

As the sensor according to the TEDS system of this embodiment, not only the acceleration sensor but also a sensor of arbitrary type such as a temperature sensor, a distortion sensor and the like can be used. Further, in the TEDS memory 16 are stored a manufacturer name, type/number of the sensor, serial number of the sensor, calibration date and time, sensitivity of the sensor, name of person who calibrates, calibration value, sensor installed position, user data and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A data transmitting and receiving apparatus, in a sensor system which has a sensor unit that includes a sensor element and a memory storing data regarding said sensor element and the data transmitting and receiving apparatus to which a detected signal from said sensor element is input and which transmits data to and receives data from said memory, and in which said input of the detected signal and said data transmission and reception is performed by sharing a single signal line, comprising:

a first logic inversion element and a second logic inversion element connected in parallel in the direction opposite to each other and connected in series to said single signal line; and a level limiter connected in series at least to either the signal output side of said first logic inversion element or the signal input side of said second logic inversion element, wherein a signal output from said first logic inversion element is attenuated by said level limiter and is blocked by said second logic inversion element.

2. The data transmitting and receiving apparatus according to claim 1, wherein said level limiter is a diode.

3. A data transmitting and receiving apparatus, in a sensor system which has a sensor unit that includes a sensor element and a memory storing data regarding said sensor element and the data transmitting and receiving apparatus to which a detected signal from said sensor element is input and which transmits data to and receives data from said memory, and in which said input of the detected signal and said data transmission and reception is performed by sharing a single signal line, comprising:

a first comparator which is connected to said single signal line and which compares a signal from said memory with a predetermined first threshold;

a first inversion circuit which is connected to said first comparator and which logically inverts the signal from said memory in accordance with a comparison result;

a diode connected to said first inversion circuit;

a data driver connected to said diode;

a second comparator branching and connected between said diode and said data driver and which compares a signal from said data driver and a sneak signal from said diode with a predetermined second threshold;

a threshold generation circuit which supplies said second threshold to said second comparator; and a second inversion circuit which is connected to said second comparator, and which logically inverts the signal from said data driver in accordance with a comparison result to be output to said single signal line and blocks the transmission of said sneak signal.

4. The data transmitting and receiving apparatus according to claim 3, further comprising:

a second diode connected between a connection branch point and said second comparator.

5. The data transmitting and receiving apparatus according to claim 4, wherein said diode is a zener diode.

6. The data transmitting and receiving apparatus according to claim 3, wherein said threshold generation circuit includes series resistance whose one end is connected to a power supply and whose other end is grounded, and said second threshold is generated by dividing the voltage of said series resistance.

7. The data transmitting and receiving apparatus according to claim 3, wherein said first inversion circuit shares a single inversion circuit with said second inversion circuit.

8. The data transmitting and receiving apparatus according to claim 3, wherein said diode is a zener diode.

* * * * *